US008548271B2

(12) United States Patent
Grimberg

(10) Patent No.: US 8,548,271 B2
(45) Date of Patent: Oct. 1, 2013

(54) SYSTEM AND METHOD FOR GAS LEAKAGE DETECTION

(75) Inventor: Ernest Grimberg, Kiriat Bialik (IL)

(73) Assignee: Opgal Optronic Industries Ltd., Karmiel, IL (US)

( * ) Notice: Subject to any disclaimer, the term of this patent is extended or adjusted under 35 U.S.C. 154(b) by 347 days.

(21) Appl. No.: 12/812,166

(22) PCT Filed: Dec. 30, 2008

(86) PCT No.: PCT/IL2008/001695
§ 371 (c)(1),
(2), (4) Date: Jul. 8, 2010

(87) PCT Pub. No.: WO2009/087614
PCT Pub. Date: Jul. 16, 2009

(65) Prior Publication Data
US 2010/0284570 A1   Nov. 11, 2010

Related U.S. Application Data

(60) Provisional application No. 61/019,613, filed on Jan. 8, 2008.

(51) Int. Cl.
G06K 9/32 (2006.01)
(52) U.S. Cl.
USPC .......................................................... 382/294
(58) Field of Classification Search
USPC .............. 382/100, 294; 250/301, 330, 336.1, 250/338.1, 394; 348/82, E5.09; 374/4, 10
See application file for complete search history.

(56) References Cited

U.S. PATENT DOCUMENTS

| 4,390,785 | A | | 6/1983 | Faulhaber et al. |
| 4,555,627 | A | | 11/1985 | McRae, Jr. |
| 5,306,913 | A | | 4/1994 | Noack et al. |
| 5,430,293 | A | * | 7/1995 | Sato et al. ............. 250/330 |

(Continued)

FOREIGN PATENT DOCUMENTS

| DE | 19744164 | 4/1999 |
| EP | 1450288 | 8/2004 |
| JP | 56147034 | 11/1981 |

OTHER PUBLICATIONS

International Search Report of International Patent Application No. PCT/IL2008/001695 dated Jul. 20, 2009.

(Continued)

*Primary Examiner* — Jose Couso
(74) *Attorney, Agent, or Firm* — Pearl Cohen Zedek Latzer, LLP

(57) ABSTRACT

Imaging system and method for detecting the presence of a substance that has a detectable signature in a known spectral band. The system comprises a thermal imaging sensor and optics, and two interchangeable band-pass uncooled filters located between the optics and the detector. A first filter transmits electromagnetic radiation in a first spectral band that includes the known spectral band and blocks electromagnetic radiation for other spectral bands. A second filter transmits only electromagnetic radiation in a second spectral band in which the substance has no detectable signature. The system also includes a processor for processing the images to obtain a reconstructed fused image involving using one or more transforms aimed at obtaining similarity between one or more images acquired with the first filter and one or more images acquired with the second filter before reconstructing the fused image.

15 Claims, 3 Drawing Sheets

(56) References Cited

U.S. PATENT DOCUMENTS

| | | | |
|---|---|---|---|
| 5,461,477 A | | 10/1995 | Marinelli et al. |
| 5,479,258 A | | 12/1995 | Hinnrichs et al. |
| 5,523,569 A | | 6/1996 | Hornfeld et al. |
| 5,656,813 A | * | 8/1997 | Moore et al. ............... 250/330 |
| 5,801,384 A | * | 9/1998 | Kirchhevel ............... 250/345 |
| 5,867,264 A | | 2/1999 | Hinnrichs |
| 6,680,778 B2 | | 1/2004 | Hinnrichs et al. |
| 6,725,705 B1 | * | 4/2004 | Huebler et al. ............ 73/40.5 A |
| 6,791,088 B1 | | 9/2004 | Williams, II et al. |
| 6,803,577 B2 | | 10/2004 | Edner et al. |
| 6,822,236 B1 | * | 11/2004 | Nelson et al. ............. 250/338.5 |
| 7,022,993 B1 | | 4/2006 | Williams, II et al. |
| 7,189,970 B2 | * | 3/2007 | Racca et al. ............. 250/338.5 |
| 7,649,174 B2 | * | 1/2010 | Mammen et al. ............. 250/330 |
| 7,855,367 B2 | * | 12/2010 | Tolton et al. ............. 250/338.5 |
| 8,193,496 B2 | * | 6/2012 | Furry ............................ 250/330 |
| 2005/0156111 A1 | | 7/2005 | Racca et al. |
| 2008/0048121 A1 | * | 2/2008 | Hinnrichs ..................... 250/340 |
| 2008/0231719 A1 | * | 9/2008 | Benson et al. ............. 348/222.1 |
| 2008/0277586 A1 | * | 11/2008 | Cardinale ............... 250/339.13 |

OTHER PUBLICATIONS

Cooper et al. "Summarizing Video Using Non-Negative Similarity Matrix Factorization" Proceeding of the 2003 IEEE Radar Conference, Huntsville, AL, May 5-8, 2003; [IEEE Radar Conference], New York, NY : IEEE US, Dec. 9, 2002, pp. 25-28 XP010642505, ISBN.

* cited by examiner

SYSTEM AND METHOD FOR GAS LEAKAGE DETECTION

CROSS-REFERENCE TO RELATED APPLICATIONS

This application is a National Phase Application of PCT International Application No. PCT/IL2008/001695, International Filing Date Dec. 30, 2008, entitled "SYSTEM AND METHOD FOR GAS LEAKAGE DETECTION", published on Jul. 16, 2009 as International Publication Number WO 2009/087614, which claims priority of U.S. Provisional Patent Application No. 61/019,613, filed on 8 Jan. 2008, both of which are incorporated herein by reference in their entirety.

FIELD OF THE INVENTION

The present invention relates to gas detection. More particularly the present invention relates to system and method for detection of gas leaks.

BACKGROUND OF THE INVENTION

Oil, gas, chemical and power plant industries are constantly seeking for efficient in-situ detection of fugitive gas leakages. Most of the gases used (like methane propane benzene etc.) in these industries are highly explosive when mixed with air, most of the leaking gases belonging to the category of greenhouse gases and therefore contributing to climate instability and temperature increase. Although the leakage problem may (mistakenly) be considered as insignificant, it is causing profit-losses to industries that do not take care of leakage problems. New regulations introduced in most of the developed countries require constant monitoring of equipment in order to control and reduce to minimum gas leakage. At it is well known, today there are many different products that facilitate detection of volatile organic components (VOC) and other gases. Most of these products belong to a category named 'sniffers'. Sniffers provide accurate gas concentration readings but suffer from extensive labor related to the inspection process that has to be performed locally in close proximity with pipes valves or any other gas carrying components.

Optical detection systems are also known.

In US 2005/0156111 (Racca et al.) there was disclosed an imager system for imaging of a plume of a fugitive gas, dependent upon an electromagnetic wavelength absorption characteristic of the gas. A bi-spectral selector assembly houses first and second filters in separate first and second optical paths for transmittal of electromagnetic energies emanating from the scene of interest. The first and second filters have adjacent mutually exclusive narrow band pass characteristics only one of which corresponds to the electromagnetic wavelength absorption characteristic of the gas. An imager captures first and second image data having traversed the first and second filters in a frame which is then processed by correlating the image data to provide displayable data including an indication of any plume of the fugitive gas. The data is displayed in real time. In one example a CCD video camera provides picture data which is displayed with the image of the plume of gas pasted thereupon.

In U.S. Pat. No. 5,656,813 (Moore et al.), there was disclosed an apparatus which remotely visualizes and detects toxic, flammable and other gas leaks and enables one to see gas clouds in real-time. A dual band thermal imaging infrared video camera fitted with a special filter images gas clouds. Image processing is utilized to develop and colorize the gas cloud information for display. The gas image is superimposed over a background image provided by a co-located visible light video camera.

DE 19744164 (Gross et al.) disclosed a high-resolution infra red camera whose narrow-band spectral filter is adjusted for transmission of specific absorption lines of the gas to be detected. A halogen lamp actively illuminates the site of investigation, which is backed, by an infra red reflector. The gas distribution is located between the reflector and the camera. The camera is equilibrated with the illuminated reflector, such that parts of the scene which remain constant over time, do not contribute to picture contrast. For further enhancement of sensitivity, a diffuse infra red reflector is employed. This comprises e.g. an anodized aluminum panel. A measuring location is set up and equipped as described, to detect methane leaks from natural gas lines.

U.S. Pat. No. 5,306,913 (Noack et al.) disclosed method and apparatus for remote optical detection of a gas present in an observed volume using a thermal imager or camera including one or more sensitive elements which are sensitive to radiant fluxes in a determined band of wavelengths, two filters interposable on the optical axis of the camera, the filters having similar transmission bands, one of which includes an absorption line characteristic of the looked-for gas, while the other of which is complementary to said absorption line, and signal processing means for taking the difference between the radiated fluxes received from two points at different temperatures in the volume as observed first through one of the filters and then through the other filter, for taking the ratio of said differences, and for deducing therefrom whether the gas is present in the observed volume.

U.S. Pat. No. 4,555,627 (McRea) disclosed a video imaging system for detecting hazardous gas leaks. Visual displays of invisible gas clouds are produced by radiation augmentation of the field of view of an imaging device by radiation corresponding to an absorption line of the gas to be detected. The field of view of an imager is irradiated by a laser. The imager receives both backscattered laser light and background radiation. When a detectable gas is present, the backscattered laser light is highly attenuated, producing a region of contrast or shadow on the image. A flying spot imaging system is utilized to synchronously irradiate and scan the area to lower laser power requirements. The imager signal is processed to produce a video display.

U.S. Pat. No. 5,523,569 (Hornfeld et al.) disclosed an apparatus for detecting leakages in structural members. The apparatus includes a device for conveying gas through the structural member to be investigated, a camera having a narrow band filter characteristic matched to the spectral absorption of the gas and a device connected to the camera for processing and displaying the recorded image of the structural member to be investigated.

JP56147034 (Hotsuta et al.) disclosed an imaging system aimed at permitting early detection of the leakage of combustible gases over a wide range by installing infrared ray measuring optical paths in an observation area, detecting the changes in infrared ray laser light absorption by gas leakage and making differential processing and the like. The system comprises infrared ray measuring optical paths, consisting of detecting units 2 and reflection mirrors that are provided in an outdoor observation area where LNG storage tanks are installed. The laser beam of the vibration band wavelength of prescribed mode of leaking methane or the like from the semiconductor laser elements of these units reciprocates in the optical paths and is detected with an infrared ray detector, then the changes in the laser beam absorption in accordance with the concentrations of the leaking methane based on spectral analyses are detected by way of lock-in amplifiers and a divider. The detected values are differentially processed in a differential circuit, and an alarm device operates in real time in response to the methane leakage. Hence, leakage of combustible gases such as methane is detected in an early time over a wide range with the relatively simple constitution.

U.S. Pat. No. 4,390,785 (Faulhaber et al.) disclosed detection of infrared radiation-absorbing or emitting gases in the atmosphere, which can be ascertained by means of an infrared imaging-analyzing means which views a given scene and receives infrared radiation therefrom. Analytic and reference beams are produced, the latter having reduced sensitivity to the gas of interest, and are converted to electric signals, which are processed in real time to provide a signal corresponding to their ratio. This ratio signal is further processed to generate an image, which can be displayed and viewed. This technique is particularly suitable for surveying large areas for seepage of methane or other hydrocarbon gases from underground gas and/or oil deposits.

U.S. Pat. No. 5,867,264 (Hinnrichs) disclosed an apparatus for spectral detection of remote objects. The apparatus consists of an input optic which focuses the field of view onto an image receiving surface consisting of an addressable spatial mask. The mask sequentially projects portions of the scene onto a diffractive optical element which focuses onto a photodetector array. The first image receiving surface of mask is partitioned into independently addressable and controllable subsurfaces, or gates, adapted to receive an electronic control signal from a programmable control signal generator. Each gate in the receiving mask directs a portion of the image incident thereon to a diffractive lens in response to a control signal communicated thereto. This gated image is dispersed by the diffractive lens and focused upon the photosensitive surface of a photodetector array. The photodetector array is partitioned into pixels having a number in ratio to the gates in the addressable mask. The signal output of a pixel within the optical path of the dispersed gated light is sampled and stored in a signal processor. A control signal generator sequentially or randomly addresses each gate in the mask causing the gate to direct that portion of the image thereon to the diffractive lens. The output signal from each pixel on the photodetector array corresponding to the addressed gate in the mask is sampled and stored until the entire image is recorded. This process is repeated as the diffractive optic is scanned through the spectral range of interest. The mask provides enhanced spectral and spatial resolution of the scene (see also U.S. Pat. No. 5,479,258, U.S. Pat. No. 6,680,778 both to Hinnrichs et al.).

U.S. Pat. No. 7,022,993 (Williams et al.) disclosed a leak detector using infrared for identifying the presence and concentration of a selected gas. For detection, radiation from an infrared emitter penetrates the sample, which is analyzed spectrally, and results in a wave length-specific signal being generated at the output. By controlling the optical filter, the radiation is controlled at a selected wavelength, to ensure coverage of all selected compounds. For refrigerants, the selected wavelength can be between approximately 8 to approximately 10 microns. This wavelength obscures other signals, thus minimizing false alarms. The leak detector has a faster time with no adverse impacts on the accuracy of the compound being detected. To further minimize false alarms and to ensure that the emitter does not come in contact with the gas, an additional filter can be used. For refrigerant compounds, the filter can block out signals below approximately 6 microns. For detecting refrigerants, two filters can be used (see also U.S. Pat. No. 6,791,088).

U.S. Pat. No. 6,803,577 (Edner et al.) disclosed a method for quantitative imaging of gas emissions utilizing optical techniques combining gas correlation techniques with thermal background radiation or as self-emission radiation. A simultaneous recording of images with and without filtering through a gas-filled cell is utilized for the identification of a selected gas. A calibration method provides the display of the integrated gas concentration spatially resolved in the generated final image. The procedure includes methods for a correct subtraction of the zero level, consisting of self-radiation from the dual-image camera device including the as correlation cell, and electronic offset, and for the calculation of the specific absorption as a function of the difference temperature between the background and the gas emission.

Other imaging systems which can also be used to detect gases are described in U.S. Pat. No. 5,461,477 (Marinelli et al.).

It is a purpose of the present invention to provide a novel automatic optical gas leakage detection device and method.

SUMMARY OF THE INVENTION

There is thus provided, in accordance with some preferred embodiments of the present invention, an imaging system for detecting the presence of a substance that has a detectable signature in a known spectral band, the system comprising:

a thermal imaging sensor comprising:

a detector sensitive to a given spectral band corresponding to a detectable signature of the substance and optics and two interchangeable band-pass uncooled filters located between the optics and the detector, a first filter that transmits only electromagnetic radiation in a first spectral band that includes the known spectral band, and a second filter that transmits only electromagnetic radiation in a second spectral band in which the substance has no detectable signature, a processor for processing images to obtain a reconstructed fused image involving using one or more transforms aimed at obtaining similarity between one or more images acquired with the first filter and one or more images acquired with the second filter before reconstructing the fused image.

Furthermore, in accordance with some preferred embodiments of the present invention, the detector is cooled.

Furthermore, in accordance with some preferred embodiments of the present invention, the two interchangeable uncooled filters comprise switching mechanism for switching between the two filters.

Furthermore, in accordance with some preferred embodiments of the present invention, the switching mechanism is selected from a group of switching mechanisms that includes a pivoting device and a sliding device.

Furthermore, in accordance with some preferred embodiments of the present invention, the system comprises a control unit for synchronizing acquiring of images with position of the filters.

Furthermore, in accordance with some preferred embodiments of the present invention, the thermal imaging sensor comprises an infrared stills camera.

Furthermore, in accordance with some preferred embodiments of the present invention, the thermal imaging sensor comprises an infrared video camera.

Furthermore, in accordance with some preferred embodiments of the present invention, there is provided a method for detecting the presence of a substance that has a detectable signature in a known spectral band, the method comprising:

acquiring at least first and second images of a scene in which the substance is supposed to be, the first image in only a first spectral band that includes the known spectral band corresponding to the detectable signature of the substance, and the second image in a second spectral band in which the substance has no detectable signature;

using at least one mathematical transform defined by finding the minimal norm between the first and second images to transform one of the two images to an image data that represents an image with greatest similarity to the other of the two images;

reconstructing a fused image by subtraction between the transformed image data and the other of the two images.

Furthermore, in accordance with some preferred embodiments of the present invention, the step of using at least one mathematical transform comprises using two mathematical transforms. A first transform is defined by finding the minimal norm between the two images to transform the second image to an image data that represents an image with greatest similarity to the first image. A second transform is defined by finding the minimal norm between the two images to transform the first image to an image data that represents an image with greatest similarity to the second image. Then the step of reconstructing the fused image comprises generating two subtractions between each of the two images and the transformed image data relating to it and adding the two subtractions.

Furthermore, in accordance with some preferred embodiments of the present invention, the step of acquiring at least first and second images of a scene in which the substance is supposed to be comprises:

providing an imaging system for detecting the presence of the substance that has a detectable signature in a known spectral band, the system comprising a detector sensitive to a given spectral band corresponding to a detectable signature of the substance and optics; and two interchangeable band-pass uncooled filters located between the optics and the detector, a first filter that transmits only electromagnetic radiation in a first spectral band that includes the known spectral band, and a second filter that transmits only electromagnetic radiation in a second spectral band in which the substance has no detectable signature, and switching between the interchangeable uncooled filters so that the first image is acquired using one of the two filters and the second image is acquired using the other of the two filters.

Furthermore, in accordance with some preferred embodiments of the present invention, the step of acquiring at least first and second images of the scene comprises acquiring the images in the form of still images.

Furthermore, in accordance with some preferred embodiments of the present invention, the step of acquiring at least first and second images of the scene comprises acquiring the images in the form of video streaming images.

Furthermore, in accordance with some preferred embodiments of the present invention, the wherein the known spectral band is within the infrared spectrum.

Furthermore, in accordance with some preferred embodiments of the present invention, the step of acquiring at least first and second images of the scene comprises acquiring the images using a single thermal imaging sensor.

Furthermore, in accordance with some preferred embodiments of the present invention, the step of acquiring at least first and second images of the scene comprises acquiring the images using more than one thermal imaging sensor directed at the scene.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF PREFERRED EMBODIMENTS

Figure 1:
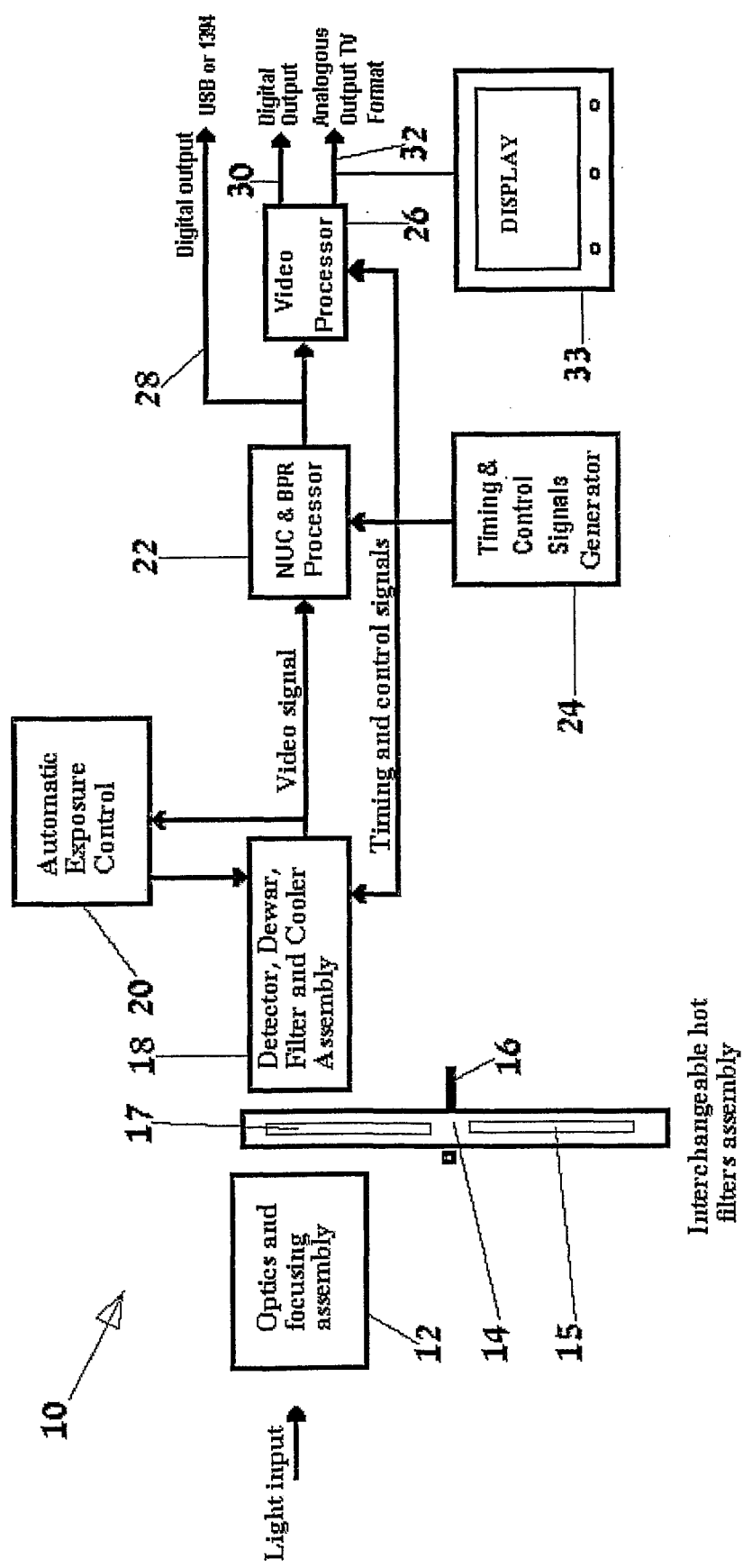
FIG. 1 illustrates a system for gas leakage detection, in accordance with a preferred embodiment of the present invention.

The present invention is directed at detecting gas leakage in a predetermined field of view of a thermal imaging system.

In order to detect gas leakage the imaging system acquires two images of the same field of view, one image in one spectral range of the suspected gas and another image in a spectral range where the suspected gas is transparent. In order to avoid registration process the two images are preferably acquired while the imaging system is kept stable in the same position and alignment (however if this is not the case than registration process has to be performed).

The two images are acquired using different uncooled filters (also referred to as "hot filters", as opposed to the cooled sensor of the camera) that are placed between the optics of the imaging system and the cooled detector of the imaging system. Each filter has a different spectral band as mentioned in the previous paragraph.

The two images are then mathematically processed using a transform that generally is aimed at matching the two acquired images in order to make them mathematically as similar as possible, and then a third image is reconstructed that is a subtraction of the two images, of which one or more are preprocessed (transformed).

Without limiting the generality of the present invention we shall use the methane gas as an example in the explanation of the present invention.

The automatic detection system and method of the present invention is based on a thermal camera opened on a larger spectral band than the optimal spectral bend that contains the methane absorbing spectral lines. The highest methane absorbing spectral lines are between 3.15 microns and 3.45 microns. The camera input spectral band is between 3 to 4 microns and therefore has a much larger spectral band than the spectral band required for methane only.

While the present example refers to absorption lines of methane emission the present invention is directed at detecting characteristic "signature" of a substance, which is either typical absorption lines or typical emission lines (note that the gas to be detected is in many cases hotter than the background temperature).

The input spectral band is limited by a fixed spectral "cooled filter" located inside a dewar flask (vacuum flask). The dewar flask is a part of a detector dewar cooler assembly (DDCA) typically used by cooled thermal cameras in order to enable optimal signal collection. Typically the cooled filter is fixed and can not be replaced or changed. This approach enables using different hot spectral band filters located outside the dewar, between the detector and the optics of the system in order to perform gas leakage detection. The escaping gas appears on a thermal image due to the following facts:

The leaking gas temperature differs from the background temperature;

The thermal camera spectral band coincides with the leaking gas emissivity (absorbance) spectra as a result of using the appropriate uncooled filter.

The leaking gas absorbs and emits light influenced by its own temperature. If the leaking gas temperature is lower than the background temperature a different number of photons will be collected from the gas than from the background. In this case the gas will appear darker than the background (assuming hot—white and cold—black). If the leaking gas temperature is higher than background temperature the leaking gas appears whiter than the background (assuming hot—white and cold—black). Therefore if the gas temperature equals to background temperature it is impossible to detect its presence by passive thermal imaging technology. Active devices that use an illuminating beam do not suffer from this limitation.

The system and method of the present invention are not limited to the use of an external illumination source and can be equally applied to passive and active imaging systems.

The present invention enables detecting gas leakages automatically, or visually, at the limit of the highest sensitivity defined, by the detector, conditions, and signal to noise ratio without being limited by the signal to clutter of the area inspected. Furthermore, the present invention facilitates automatically or visually detecting any small area low contrast 'hidden' information in one spectral band by using a near located spectral band in which the 'hidden' information has different properties. The example presented here discusses detecting methane leakage by using the spectral band in which methane has absorption lines and a near spectral band in which the methane gas is transparent.

Reference is now made to FIG. 1, illustrating a system for gas leakage detection, in accordance with a preferred embodiment of the present invention.

A gas leak detection system 10, according to a preferred embodiment of the present invention comprises a thermal imaging sensor 18 (typically an IR video or stills camera) that responds to the input radiation on a spectral band larger than the spectral band required for the gas detection. Typically (although the present invention is not limited to this arrangement) the thermal sensor would include detector, dewar, filter and cooler assembly. Optics and focusing assembly 12 is provided in front of the thermal sensor, for ensuring appropriate optical path and focusing. Exposure control 20 is provided to control the exposure of the thermal sensor.

Usually any gas has more than one spectral region in which it emits or absorbs light. The spectral band with the gas highest emissivity (absorption) should be used and the spectral band extension should be in continuation or close by. For example, methane emissivity spectral band is between 3.15 to 3.45 microns, while a camera used for detection is responsive between 3.0 till 4.0 microns due to the fact that the cold filter inside the dewar is transparent between 3.0 till 4.0 microns. (It is obvious that the detector itself made of InSb is responsive on a larger spectral band from 0.8 microns till 5.5 microns.) At least two different uncooled filters (15, 17) should be used: one filter that transmits in the spectral band of the gas to be detected, and a complementary, additional filter in the active camera's spectral band, where the required gas is transparent.

With respect to the methane example, the first filter transmits between 3.15 and 3.45 microns and the complementary filter transmits between 3.6 and 3.9 microns.

Filter's flatness, parallelism and positioning accuracy should be designed so that whenever the filters are interchanged the image location on the detector remains unchanged.

A switching mechanism 14 (such as, for example, a sliding device or a pivoting device 16) is provided for interchanging between the two filters so that the detector is capable of collecting data in one spectral band and after that, on the other spectral band.

The uncooled filters 15, 17, and the switching mechanism 14 should be designed so that the information registration will remain constant. Image registration should not change as a result of switching between the two filters.

A processor 26 is used to collect and process the image data accumulated by the detector. In case where the spectral band used is in the infrared spectral band, the electronic system should perform additional processes like non uniformity correction (NUC) and bad pixels replacement (BPR) (processor 22), and other IR related processes that are inherent in IR imaging systems. Timing and control signals generator 24 cooperates with NUC-BPR processor 22.

Uncooled filters in between the optics and the detector cause uniformity instability due to the energy emitted by the uncooled filter in the spectral band of the cooled detector. The emitted energy of the uncooled filter is a function of the temperature of the uncooled filter. Usually the temperature of the uncooled filter in known thermal cameras is not stabilized. Therefore temperature fluctuations may impart non-uniformity on the radiation collected by the detector. The emitted radiation from the uncooled filter is not focused on the detector and is therefore manifested by low spatial frequencies.

In order to overcome this instability problem, the influence of the uncooled filter as a function of temperature is measured in a temperature controlled environment and the collected data is used for compensating the readings during regular operation.

The output can be in the form of direct digital output for further processing (for example, through optional USB or 1394 cable), or digital image output or analog image output for display (on a display device 33).

The imaging system described hereinabove is aimed at obtaining images of a suspected gas leak event, without external illumination (although such external illumination may be used too).

The imaging system is used to obtain two images, one in the spectral band of the suspected gas and one in different yet relatively close spectral band in which the gas is practically transparent.

Next, mathematical processing is carried out aimed at providing a fused reconstructed image in which the existence of leaked gas is enhanced. This is done by mathematically processing either one of the acquired images or both.

In one embodiment of the present invention either the reference image (the image acquired in the spectral band where the suspected gas is practically transparent) or the gas image (the image acquired in the spectral band of the suspected gas) is processed to make it as similar as possible to the other image. By "similar" is meant that the mathematical distance—the norm—between the two matrices representing the images is minimal.

One way to define the norm is to refer to the Euclidean definition:

$$\text{Norm}^2 = \sum_i \sum_j (P\_gas_{i,j} - P\_ref_{i,j})^2,$$

Other norm definitions may alternatively apply (for example, Chebichev's norm).

One method of achieving similarity between the two images is to employ the "minimum mean square" algorithm based on the orthogonality principle. It is noted that other mathematical ways can be used to obtain similarity between the images.

Figure 2:
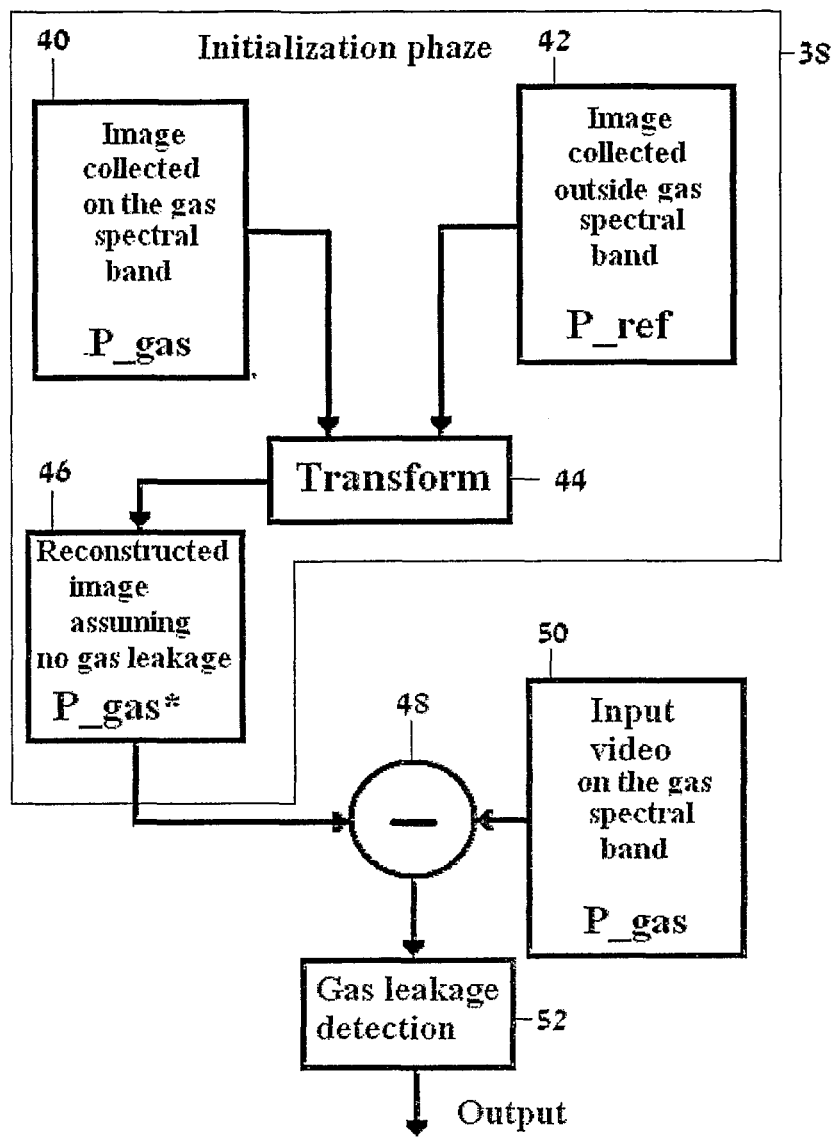
FIG. 2 illustrates a method for detecting gas leakage, in accordance with a preferred embodiment of the present invention, employing a single transformation.

An algorithm for generating an image of gas leak using the imaging system described hereinabove is now detailed (see also FIG. 2).

The procedure comprises two stages:

The first stage is the initialization phase 38.

The second stage is the detection (display) phase 52.

The initialization stage comprises several steps. During the first step the uncooled filter has to be set for a spectral band that does not match the spectral lines of the gas that has to be detected. In this spectral band the camera acquires a reference image (42 in FIG. 2) $P\_ref_{i,j}$, preferably by averaging a large number of frames in order to obtain a high signal to noise ratio. The image can be acquired with or without external illumination.

At the second step the uncooled filter of the gas spectral band is inserted in front of the detector. A new picture (40 in FIG. 2) $P\_gas_{i,j}$ is acquired, preferably by averaging a large number of frames in order to improve the signal to noise ratio. The image can be acquired with or without external illumination. During this step a transformation 44 that translates the $P\_ref_{i,j}$ to $P\_gas_{i,j}$ is performed:

$$j\_min = j - \Delta_y$$
$$i\_min = i - \Delta_x$$
$$j\_max = j + \Delta_y$$
$$i\_max = i + \Delta_x$$

$$c11_{i,j} = \sum_{j=j\_min}^{j\_max} \sum_{i=i\_min}^{i\_max} P\_ref_{i,j}^4$$

$$c12_{i,j} = \sum_{j=j\_min}^{j\_max} \sum_{i=i\_min}^{i\_max} P\_ref_{i,j}^3$$

$$c13_{i,j} = \sum_{j=j\_min}^{j\_max} \sum_{i=i\_min}^{i\_max} P\_ref_{i,j}^2$$

$$q1_{i,j} = \sum_{j=j\_min}^{j\_max} \sum_{i=i\_min}^{i\_max} P\_gas_{i,j} P\_ref_{i,j}^2$$

$$c21_{i,j} = \sum_{j=j\_min}^{j\_max} \sum_{i=i\_min}^{i\_max} P\_ref_{i,j}^3$$

$$c22_{i,j} = \sum_{j=j\_min}^{j\_max} \sum_{i=i\_min}^{i\_max} P\_ref_{i,j}^2$$

$$c23_{i,j} = \sum_{j=j\_min}^{j\_max} \sum_{i=i\_min}^{i\_max} P\_ref_{i,j}$$

$$q2_{i,j} = \sum_{j=j\_min}^{j\_max} \sum_{i=i\_min}^{i\_max} P\_gas_{i,j} P\_ref_{i,j}$$

$$c31_{i,j} = \sum_{j=j\_min}^{j\_max} \sum_{i=i\_min}^{i\_max} P\_ref_{i,j}^2$$

$$c32_{i,j} = \sum_{j=j\_min}^{j\_max} \sum_{i=i\_min}^{i\_max} P\_ref_{i,j}$$

$$c33_{i,j} = \sum_{j=j\_min}^{j\_max} \sum_{i=i\_min}^{i\_max} 1$$

$$q3_{i,j} = \sum_{j=j\_min}^{j\_max} \sum_{i=i\_min}^{i\_max} P\_gas_{i,j}$$

The values calculated above describe a set of three equations that defined three unknowns as following:

$$\begin{bmatrix} c11_{i,j} & c12_{i,j} & c13_{i,j} \\ c21_{i,j} & c22_{i,j} & c23_{i,j} \\ c31_{i,j} & c32_{i,j} & c33_{i,j} \end{bmatrix} \cdot \begin{bmatrix} a_{i,j} \\ b_{i,j} \\ c_{i,j} \end{bmatrix} = \begin{bmatrix} q1_{i,j} \\ q2_{i,j} \\ q3_{i,j} \end{bmatrix}$$

The set of equations presented above defines the following Transform:

$$P\_gas_{i,j}^* = a_{i,j} \cdot P\_ref_{i,j}^2 + b_{i,j} \cdot P\_ref_{i,j} + c_{i,j}$$

Real-time gas detection phase can be performed by visual inspection or by an automatic algorithm. The first real time stage is common to both implementations:

$$\text{Output}_{i,j} = P\_gas_{i,j} - P\_gas_{i,j}^*$$

Pout can be displayed (after dynamic range compression processing) for visual inspection and leak gas detection. P_gas and Output can be real-time signals or single frames, while P_gas* is constant as long as the camera position has not been changed or the field of view has not been changed.

The assumption 46 behind this mathematical algorithm is that the leakage area is small relative to the $4 \cdot \Delta_x \cdot \Delta_y$ area. The transformation has been calculated by the well known process of minimum mean square error (the orthogonality principle).

Automatic detection comprises some additional stages that are:

A histogram of Output is generated, typically involving the following steps:

Minimum and maximum values of Output are determined. Max_output and Min_output represent the maximum and minimum values of Output. The histogram may be collected on a vector that contains 1024 different entries. Therefore:

$$Z = \frac{1024}{\text{Max\_output} - \text{Min\_output}}$$

$$H(\text{floor}(Z \cdot (\text{Output}_{i,j} - \text{Min\_output})) =$$
$$H(\text{floor}(Z \cdot (\text{Output}_{i,j} - \text{Min\_output})) + 1$$

Most of the expected values in Output image are around zero, therefore located on the main blob of the histogram. Any gas leakage might be hotter or colder than the background therefore might appear on the right or on the left of the main blob. The threshold values should be obtained by detecting the valley (local minimum) to the left and right of the main blob.

Figure 3:
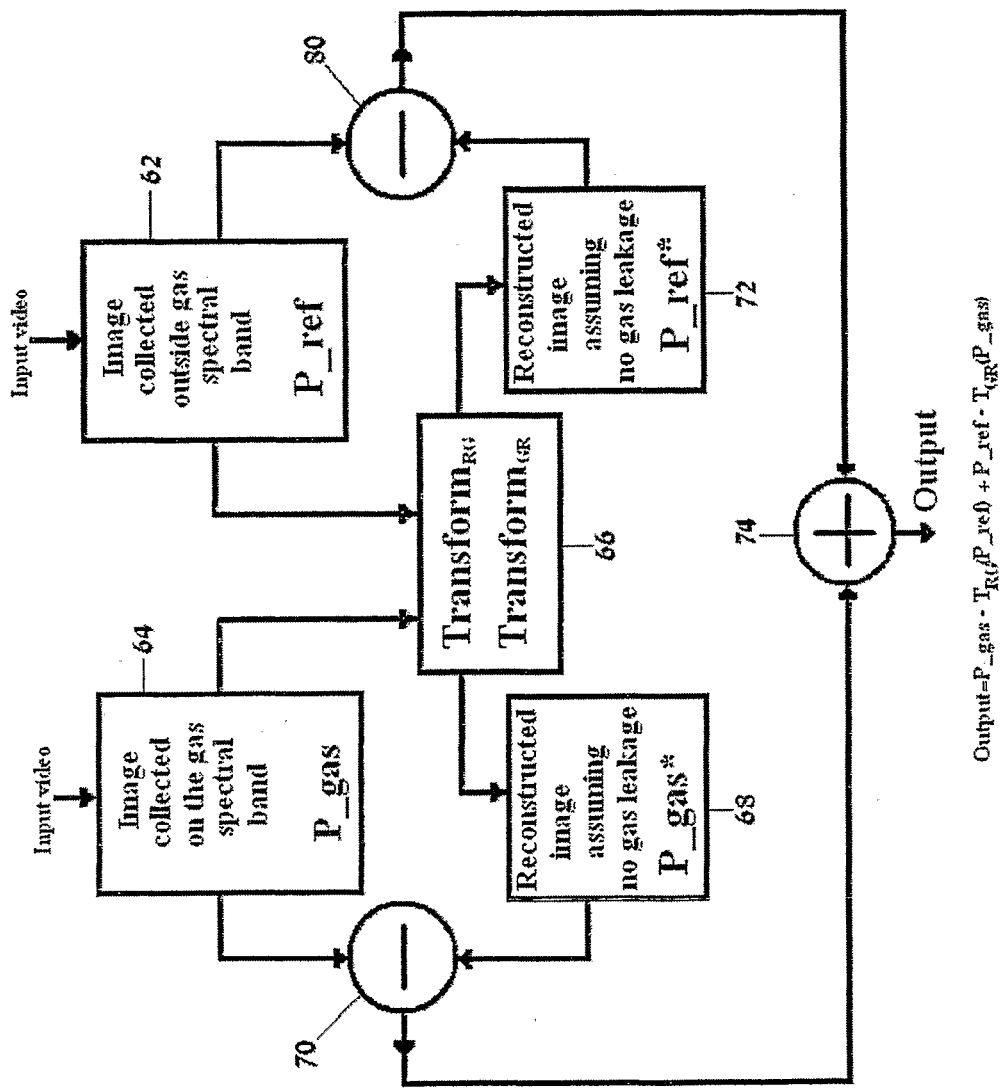
FIG. 3 illustrates a method for detecting gas leakage, in accordance with a preferred embodiment of the present invention, employing double transformation.

An alternative method for detecting gas leakage, in according with another preferred embodiment of the present invention involves double transformation (see FIG. 3).

In this second embodiment of the present invention both the reference image (the image acquired in the spectral band where the suspected gas is practically transparent) and the gas image (the image acquired in the spectral band of the suspected gas) are symmetrically processed to make them as similar as possible to one another.

The initialization stage contains the following process:

During the first step the uncooled filter has to be set for a spectral band that does not contains the spectral lines of the gas that has to be detected. On this spectral band the camera will acquire a reference image 62 $P\_ref_{i,j}$, preferably by averaging a large number of frames in order to obtain a high signal to noise ratio. ($P\_ref_{i,j}$ represents the acquired reference image after non uniformity correction (NUC) and bad pixels replacement (BPR), in the probable case of IR imaging).

Real time process contains the following steps:

First the uncooled filter is restored to the gas spectral band. A new image 64 $P\_gas_{i,j}$ is acquired in real time as part of the real time process. ($P\_gas_{i,j}$ represents the acquired image after NUC, BPR, in the probable case of IR imaging).

During this step Transform$_{RG}$ 66 (RG=Reference to Gas) that translates the $P\_ref_{i,j}$ to $P\_gas_{i,j}$ is performed according to the following algorithm:

$$j\_min = j - \Delta_y$$
$$i\_min = i - \Delta_x$$
$$j\_max = j + \Delta_y$$
$$i\_max = i + \Delta_x$$

$$c11_{i,j} = \sum_{i=i\_min}^{i\_max} \sum_{j=j\_min}^{j\_max} P\_ref_{i,j}^4$$

$$c12_{i,j} = \sum_{j=j\_min}^{j\_max} \sum_{i=i\_min}^{i\_max} P\_ref_{i,j}^3$$

$$c13_{i,j} = \sum_{j=j\_min}^{j\_max} \sum_{i=i\_min}^{i\_max} P\_ref_{i,j}^2$$

$$q1_{i,j} = \sum_{j=j\_min}^{j\_max} \sum_{i=i\_min}^{i\_max} P\_gas_{i,j} * P\_ref_{i,j}^2$$

$$c21_{i,j} = \sum_{j=j\_min}^{j\_max} \sum_{i=i\_min}^{i\_max} P\_ref_{i,j}^3$$

$$c22_{i,j} = \sum_{j=j\_min}^{j\_max} \sum_{i=i\_min}^{i\_max} P\_ref_{i,j}^2$$

$$c23_{i,j} = \sum_{j=j\_min}^{j\_max} \sum_{i=i\_min}^{i\_max} P\_ref_{i,j}$$

$$q2_{i,j} = \sum_{j=j\_min}^{j\_max} \sum_{i=i\_min}^{i\_max} P\_gas_{i,j} P\_ref_{i,j}$$

$$c31_{i,j} = \sum_{j=j\_min}^{j\_max} \sum_{i=i\_min}^{i\_max} P\_ref_{i,j}^2$$

$$c32_{i,j} = \sum_{j=j\_min}^{j\_max} \sum_{i=i\_min}^{i\_max} P\_ref_{i,j}$$

$$c33_{i,j} = \sum_{j=j\_min}^{j\_max} \sum_{i=i\_min}^{i\_max} 1$$

$$q3_{i,j} = \sum_{j=j\_min}^{j\_max} \sum_{i=i\_min}^{i\_max} P\_gas_{i,j}$$

The values calculated above describe a set of 3 equations that defined 3 unknowns as following:

$$\begin{bmatrix} c11_{i,j} & c12_{i,j} & c13_{i,j} \\ c21_{i,j} & c22_{i,j} & c23_{i,j} \\ c31_{i,j} & c32_{i,j} & c33_{i,j} \end{bmatrix} \cdot \begin{bmatrix} a_{i,j} \\ b_{i,j} \\ c_{i,j} \end{bmatrix} = \begin{bmatrix} q1_{i,j} \\ q2_{i,j} \\ q3_{i,j} \end{bmatrix}$$

The set of equations presented above defines Transform$_{RG}$:

$$P\_gas_{i,j}^* = a_{i,j} \cdot P\_ref_{i,j}^2 + b_{i,j} \cdot P\_ref_{i,j} + c_{i,j}$$

This paragraph describes the mathematical means required to calculate Transform$_{GR}$.

$$c11_{i,j} = \sum_{j=j\_min}^{j\_max} \sum_{i=i\_min}^{i\_max} P\_gas_{i,j}^4$$

$$c12_{i,j} = \sum_{j=j\_min}^{j\_max} \sum_{i=i\_min}^{i\_max} P\_gas_{i,j}^3$$

$$c13_{i,j} = \sum_{j=j\_min}^{j\_max} \sum_{i=i\_min}^{i\_max} P\_gas_{i,j}^2$$

$$q1_{i,j} = \sum_{j=j\_min}^{j\_max} \sum_{i=i\_min}^{i\_max} P\_ref_{i,j} * P\_gas_{i,j}^2$$

$$c21_{i,j} = \sum_{j=j\_min}^{j\_max} \sum_{i=i\_min}^{i\_max} P\_gas_{i,j}^3$$

$$c22_{i,j} = \sum_{j=j\_min}^{j\_max} \sum_{i=i\_min}^{i\_max} P\_gas_{i,j}^2$$

$$c23_{i,j} = \sum_{j=j\_min}^{j\_max} \sum_{i=i\_min}^{i\_max} P\_gas_{i,j}$$

$$q2_{i,j} = \sum_{j=j\_min}^{j\_max} \sum_{i=i\_min}^{i\_max} P\_gas_{i,j} P\_ref_{i,j}$$

$$c31_{i,j} = \sum_{j=j\_min}^{j\_max} \sum_{i=i\_min}^{i\_max} P\_gas_{i,j}^2$$

$$c32_{i,j} = \sum_{j=j\_min}^{j\_max} \sum_{i=i\_min}^{i\_max} P\_gas_{i,j}$$

$$c33_{i,j} = \sum_{j=j\_min}^{j\_max} \sum_{i=i\_min}^{i\_max} 1$$

$$q3_{i,j} = \sum_{j=j\_min}^{j\_max} \sum_{i=i\_min}^{i\_max} P\_ref_{i,j}$$

The values calculated above describe a set of 3 equations that defined 3 unknowns as following:

$$\begin{bmatrix} c11_{i,j} & c12_{i,j} & c13_{i,j} \\ c21_{i,j} & c22_{i,j} & c23_{i,j} \\ c31_{i,j} & c32_{i,j} & c33_{i,j} \end{bmatrix} \cdot \begin{bmatrix} a_{i,j} \\ b_{i,j} \\ c_{i,j} \end{bmatrix} = \begin{bmatrix} q1_{i,j} \\ q2_{i,j} \\ q3_{i,j} \end{bmatrix}$$

The set of equations presented above defines the Transform$_{GR}$:

$$P\_ref_{i,j}^* = a_{i,j} \cdot P\_gas_{i,j}^2 + b_{i,j} \cdot P\_gas_{i,j} + c_{i,j}$$

The Output image is defined by the following expression:

$$\text{Output}_{i,j} = P\_gas_{i,j} - T_{RG}(P\_ref_{i,j}) + P\_ref_{i,j} - T_{GR}(P\_gas_{i,j})$$

The output of the symmetric transform appears above. If $T_{RG} = T_{GR} = 1$ the Output$_j$ equals 0 (zero) by definition. The symmetrical treatment appears to have a better result in removing the background enabling a more enhanced gas signal at the output.

During the real time leak detection a new gas image is acquired, the transform Transform$_{GR}$ is calculated and Output image is reconstructed.

In general, the mathematical models presented herein are relatively simple polynomial expansions of second degree. However other mathematical models can be used for example, models based on higher polynomial expansions or models based on additional variables like the temperature of the optics, ambient temperature, detector exposure time or other variables.

A system according to the present invention does not involve dual optics (as suggested by Racca (US 2005/156111, see hereinabove in the "background of the invention" section of the present specification), nor does it require external illumination as required for example by Gross (DE 19744164, see hereinabove in the "background of the invention" section of the present specification).

The system and method of the present invention may look similar to Moore (U.S. Pat. No. 5,656,813, see hereinabove in the "background of the invention" section of the present specification), but there are several main differences:

Any camera collects photons in some spectral band. The gases that we are interested in visualizing emit (absorb) in the spectral band 3 to 4 microns. For example methane emits (absorbs) in the spectral band 3.15 till 3.45 microns. In the rest of the spectral band between 3.45 till 5 microns the methane is practically transparent. The ambient temperature is around 300 degrees Kelvin for most of the applications on Earth (however the facts presented are correct for any ambient temperature). Black body radiation properties are considerably different for different spectral bands. The signal collected by any thermal camera is proportional to the amount of photons collected and to the derivative of this amount versus temperature. The differences in temperature and emissivity (absorption) between the different objects in the field of view makes possible to distinguish between them. Two thermal pictures collected in different spectral band or even in close spectral bands, have different properties and there are no global values like gain and offset that can cause the two pictures to be equal so that a simple subtraction will eliminate the background as suggested by Moore (U.S. Pat. No. 5,656, 813). In order to facilitate meaningful subtraction it is necessary to make the mathematical matrices that represent the two images to be as similar as possible and this is accomplished by performing the suggested transform (on one or two images as explained hereinabove).

The method of the present invention can also be successfully implemented for fusion of two or more images acquired by two different sensors. By "imaging fusion" is meant to refer to combing relevant information from of two or more images.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. An imaging system for detecting the presence of a substance that has a detectable signature in a known spectral band, the system comprising:
    a thermal imaging sensor comprising:
        a detector sensitive to a given spectral band; and
        two interchangeable band-pass uncooled filters located between the optics and the detector, comprising:
        a first uncooled filter arranged to transmit only electromagnetic radiation in a first spectral band that includes the known spectral band, and
        a second uncooled filter arranged to transmit only electromagnetic radiation in a second spectral band which does not include the known spectral band and in which the substance has no detectable signature,
        wherein the given spectral band of the detector is selected to include the first and the second spectral bands, and the detector is arranged to acquire, by interchanging the filters, at least one first image in the first spectral band and at least one second image in the second spectral band, the images being of a scene in which the substance is supposed to be, and
    an image processor arranged to enhance a similarity between the at least one first image and the at least one second image and reconstruct at least one fused image therefrom, wherein enhancing the similarity is carried out by applying at least one transform to at least one of the images.

2. The system as claimed in claim 1, wherein the detector is cooled.

3. The system as claimed in claim 1, wherein the imaging system further comprises a switching mechanism arranged to switch between the two filters.

4. The system as claimed in claim 3, wherein the switching mechanism is selected from a group of switching mechanisms that includes a pivoting device and a sliding device.

5. The system as claimed in claim 1, comprising a control unit for synchronizing the acquiring of images with a position of the filters.

6. The system as claimed in claim 1, wherein the thermal imaging sensor comprises an infrared stills camera.

7. The system as claimed in claim 1, wherein the thermal imaging sensor comprises an infrared video camera.

8. A method of detecting the presence of a substance that has a detectable signature in a known spectral band, the method comprising:
    acquiring, by a thermal imaging sensor, at least a first and a second image of a scene in which the substance is supposed to be, the first image in only a first spectral band that includes the known spectral band corresponding to the detectable signature of the substance, and the second image in a second spectral band in which the substance has no detectable signature;
    using at least one mathematical transform defined by finding a minimal norm between the first and second images to transform one of the two images to an image data that represents an image with greatest similarity to the other of the two images; and reconstructing a fused image by subtraction between the transformed image data and the other of the two images, wherein at least one of the using and the reconstructing is carried out by a computer processor.

9. The method as claimed in claim 8, wherein the step of using at least one mathematical transform comprises using two mathematical transforms, a first transform defined by finding the minimal norm between the two images to transform the second image to an image data that represents an image with greatest similarity to the first image and a second transform defined by finding the minimal norm between the two images to transform the first image to an image data that represents an image with greatest similarity to the second image, and wherein the step of reconstructing the fused image comprises generating two subtractions between each of the two images and the transformed image data relating to it and adding the two subtractions.

10. The method as claimed in claim 8, wherein the step of acquiring at least first and second images of a scene in which the substance is supposed to be comprises:

providing an imaging system for detecting the presence of the substance that has a detectable signature in a known spectral band, the system comprising:

a detector sensitive to a given spectral band corresponding to a detectable signature of the substance and optics; and two interchangeable band-pass uncooled filters located between the optics and the detector, a first filter that transmits only electromagnetic radiation in a first spectral band that includes the known spectral band, and a second filter that transmits only electromagnetic radiation in a second spectral band in which the substance has no detectable signature, and switching between the interchangeable uncooled filters so that the first image is acquired using one of the two filters and the second image is acquired using the other of the two filters.

11. The method as claimed in claim 8, wherein the step of acquiring at least first and second images of the scene comprises acquiring the images in a form of still images.

12. The method as claimed in claim 8, wherein the step of acquiring at least first and second images of the scene comprises acquiring the images in a form of video streaming images.

13. The method as claimed in claim 8, the wherein the known spectral band is within the infrared spectrum.

14. The method as claimed in claim 8, wherein the step of acquiring at least first and second images of the scene comprises acquiring the images using a single thermal imaging sensor.

15. The method as claimed in claim 8, wherein the step of acquiring at least first and second images of the scene comprises acquiring the images using more than one thermal imaging sensor directed at the scene.

* * * * *